United States Patent
Hill

(10) Patent No.: US 7,793,471 B2
(45) Date of Patent: Sep. 14, 2010

(54) FLOATING FLOOR ASSEMBLED FROM AN ARRAY OF INTERCONNECTED SUBUNITS, EACH OF WHICH INCLUDES A STONE, CERAMIC, OR PORCELAIN TILE BONDED TO AN INJECTION MOLDED POLYOLEFIN SUBSTRATE

(76) Inventor: David Tilghman Hill, 1514 W. 400 South, Suite 1, Orem, UT (US) 84058

( * ) Notice: Subject to any disclaimer, the term of this patent is extended or adjusted under 35 U.S.C. 154(b) by 195 days.

(21) Appl. No.: 12/188,794

(22) Filed: Aug. 8, 2008

(65) Prior Publication Data

US 2009/0139160 A1 Jun. 4, 2009

(51) Int. Cl.
*E04F 15/02* (2006.01)
(52) U.S. Cl. .......................... 52/177; 52/602; 52/591.5; 428/33; 428/44; 428/57
(58) Field of Classification Search .................... 52/177, 52/384, 698, 592.1, 578, 591, 591.5, 592, 52/519, 390, 392, 574, 591.4, 591.2, 403.1, 52/180, 589.1, 586.1, 582.2; 156/265; 428/60, 428/61, 81, 88, 192; 15/238
See application file for complete search history.

(56) References Cited

U.S. PATENT DOCUMENTS

| | | | |
|---|---|---|---|
| 3,687,773 A * | 8/1972 | Wangborg | 156/265 |
| 4,860,510 A * | 8/1989 | Kotler | 52/177 |
| 4,930,286 A | 6/1990 | Kotler | |
| 5,640,821 A * | 6/1997 | Koch | 52/698 |
| 5,787,654 A * | 8/1998 | Drost | 52/177 |
| 5,950,378 A * | 9/1999 | Council et al. | 52/177 |
| 5,992,106 A * | 11/1999 | Carling et al. | 52/177 |
| 6,098,354 A * | 8/2000 | Skandis | 52/177 |
| 6,526,705 B1 | 3/2003 | MacDonald | |
| 6,751,912 B2 * | 6/2004 | Stegner et al. | 52/177 |
| 7,340,865 B2 * | 3/2008 | Vanderhoef | 52/177 |
| 7,516,587 B2 * | 4/2009 | Barlow | 52/591.2 |
| 7,571,572 B2 * | 8/2009 | Moller, Jr. | 52/177 |
| 2007/0044412 A1 * | 3/2007 | Forster et al. | 52/592.1 |
| 2007/0251172 A1 * | 11/2007 | Cramer et al. | 52/384 |

* cited by examiner

*Primary Examiner*—Richard E Chilcot, Jr.
*Assistant Examiner*—Alp Akbasli
(74) *Attorney, Agent, or Firm*—Angus C. Fox, III

(57) ABSTRACT

A floating floor assembled from an array of interconnected subunits, each of which includes a stone, ceramic or porcelain tile and a one-piece polymeric plastic substrate to which the stone, ceramic, or porcelain tile is bonded. Each substrate is injection molded from certain polyolefin polymers and incorporates the interlock structure and certain other features of the modular sports tiles of U.S. Pat. No. 4,930,286. The substrates of the present invention, however, differ in that each substrate incorporates a vertical stabilization system, the plastic support grid is formed by three sets of mutually intersecting walls, with each set being angularly offset from the other two by 120 degrees, and each substrate is sized to precisely fit a stone, ceramic or porcelain tile, which is accurately positioned by tile locator tabs on a pair of intersecting sides of the substrate.

20 Claims, 15 Drawing Sheets

FLOATING FLOOR ASSEMBLED FROM AN ARRAY OF INTERCONNECTED SUBUNITS, EACH OF WHICH INCLUDES A STONE, CERAMIC, OR PORCELAIN TILE BONDED TO AN INJECTION MOLDED POLYOLEFIN SUBSTRATE

PRIORITY DATA

This application has a claim of priority based on the filing of non-provisional utility patent application Ser. No. 11/947,837, of the same title, and by the same inventor on Nov. 30, 2007.

BACKGROUND OF THE INVENTION

1. Field of the Invention

The present invention relates to floating floors, tile floors and, more particularly, to floating floors assembled from an array of interconnected subunits, each of which includes a ceramic or stone tile bonded to an injection molded plastic substrate, as well as to a method for manufacturing such subunits.

2. Description of the Prior Art

Several attempts have been made in recent years to create floating floors using ceramic tile as the wearing surface. The applicant is aware that, for a short time, a number of U.S. flooring distributors sold boxes of ceramic tile flooring which interlocked to form a floating tile floor. The tiles were mounted on laminate flooring substrates. However, after consumers experienced severe problems related to tile delamination, poor interlocking performance, dirt build-up between adjoined pieces of tile units, and inability to accommodate significant thermal expansion, Costco recalled the product and wrote off as a loss a large inventory of product.

Probably the most successful floating tile floor system developed to date is covered by U.S. Pat. No. 4,930,286 (hereinafter the '286 patent), which is titled MODULAR SPORTS TILE WITH LATERAL ABSORPTION. This patent, in its entirety, is incorporated in this patent application by reference. Developed by Daniel Kotler as a continuous flat athletic floor covering, the floating floor is assembled from interlocking, injection-molded, modular plastic tiles. Each tile includes a plastic support grid made of two sets of mutually-perpendicular intersecting walls. The intersecting wall structure produces an array of interstitial openings that is bounded by a perimetric wall. A support leg, positioned at each wall intersection point, provides structural reinforcement and stress reduction where the walls intersect. A continuous sheet of plastic material, which overlies the support grid, functions as a playing surface. A peripherally-positioned interlock structure, having both male and female components, enables the coupling of any tile to adjacent tiles. The support grid, the support legs, the continuous sheet of plastic material, and the interlock structure are all injection molded as a unitary piece. The interlock structure provides a continuous, uniform displacement gap between adjacent tiles, and also provides a yielding and resilient response to lateral mechanical forces, as well as to forces produced by thermal expansion. The tiles are preferably molded from a tough polymeric thermoplastic compound. It is suggested that low-density polyethylene and polypropylene copolymer are ideally suited for the application, as both polymers are very tough materials having high impact strength, high resistance to corrosive chemicals, and high resistance to abrasion.

As the athletic floor tiles of the '286 patent are preferably injection molded from polyolefin polymer plastics, a detailed description of polyolefin polymers is in order. Polyolefins are generally considered to be the most useful class of synthetic polymers. They are certainly the most widely-used polymers. Also known as polyalkenes, according to nomenclature established by the International Union of Pure and Applied Chemistry (IUPAC), polyolefins are generally prepared using organometallic catalysts, either in solution or supported on a solid surface. In the 1950s, the German chemist Karl Ziegler developed a catalyst for ethylene (ethene is its IUPAC name) polymerization based on a catalyst formed by the reaction of TiCl4 with Al(C2H5)3. Soon thereafter Giulio Natta of Italy made use of this type of catalyst for the polymerization of propylene (propene is its IUPAC name) to produce polymers with highly regular structures. The intimate details of the reactions of these commercial catalytic processes are not entirely understood, but there are strong indications from more easily studied soluble organometallic catalysts that alkenes coordinate to a metal center and then insert into a hydrocarbon chain, producing a longer-chain hydrocarbon attached to the metal center. Repetition of this process leads to extremely-long-chain hydrocarbon polymers. Polyethylene and polypropylene are the most well-known of this genre of polymers, as these plastics are used in consumer items ranging from milk containers and plastic bags to artificial limbs and car bumpers. Polyolefins, the only plastics that are lighter than water, are also break-resistant, non-toxic, and non-contaminating. Polyolefins are relatively inert. In fact, there is no known solvent for polyolefins at room temperature. They easily withstand exposure to nearly all chemicals at room temperature for up to 24 hours, although strong oxidizing agents eventually cause oxidation and embrittlement. Polyolefins are also damaged by long-term exposure to light.

The polymerisation of ethylene results in an essentially straight chain, high molecular weight hydrocarbon. The polyethylenes are classified according to the relative degree of branching (side chain formation) in their molecular structures, which can be controlled with selective catalysts. Aggressive solvents will cause polyethylene to soften and swell, but these effects are normally reversible. Low-density polyethylene (LDPE) has more extensive branching, resulting in a less compact molecular structure. High-density polyethylene (HDPE) has minimal branching, which makes it more rigid and less permeable than LDPE. Linear low-density polyethylene (LLDPE) combines the toughness of low-density polyethylene with the rigidity of high-density polyethylene. Cross-linked high-density polyethylene (XLPE) is a form of high-density polyethylene wherein the individual molecular chains are bonded to each other (using heat, plus chemicals or radiation) to form a three-dimensional polymer of extremely high molecular weight. This structure provides superior stress-crack resistance and somewhat improves the toughness, stiffness and chemical resistance of HDPE. XLPE is a superior material for moulding very large storage tanks. Ultra high molecular weight polyethylene (UHMWPE), also known as high modulus polyethylene (HMPE) or high performance polyethylene (HPPE), is a thermoplastic. It has extremely long chains, with molecular weight numbering in the millions, usually between 2 and 6 million. The longer chain serves to transfer load more effectively to the polymer backbone by strengthening intermolecular interactions. This results in a very tough material, with the highest impact strength of any thermoplastic presently made. It is highly resistant to corrosive chemicals, with exception of oxidizing acids. It has extremely low moisture absorption, very low coefficient of friction, is self lubricating and is highly resistant to abrasion (15 times more resistant to abrasion than carbon steel). Its coefficient of friction is significantly lower than that of nylon and acetal, and is comparable to teflon, but UHMWPE has better abrasion resistance than teflon.

Polypropylene (PP) is structurally similar to polyethylene, but each unit of the chain has a methyl group attached. It is translucent, autoclavable, and slightly more susceptible than polyethylene to strong oxidizing agents. It offers the best stress-crack resistance of the polyolefins. Products made of polypropylene are brittle at 0° C. and may crack or break if dropped from a height of more than several feet.

Polypropylene copolymer (PPCO), which is also known as polyallomer (PA), is an essentially linear copolymer with repeated sequences of ethylene and propylene. It combines some of the advantages of both polymers. PPCO is autoclavable, and offers much of the high-temperature performance of polypropylene. It also provides some of the low-temperature strength and flexibility of polyethylene.

SUMMARY OF THE INVENTION

The present invention provides a floating floor assembled from an array of interconnected subunits, each of which includes a stone, ceramic or porcelain tile and a one-piece polymeric plastic substrate to which the stone, ceramic, or porcelain tile is bonded. Each substrate is injection molded from certain polyolefin polymers and incorporates the interlock structure about the outer perimeter and other features of the modular sports tiles of '286 patent. However, the substrates of the present invention, as compared to the sports tiles, are modified in several significant and non-obvious respects. Firstly, the plastic support grid is formed by three, rather than two, sets of mutually intersecting walls, which are unitary with an upper laminar sheet that is coextensive with the support grid. Each set is angularly offset from the other two by 120 degrees, resulting in an array of interstitial openings having the shape of equilateral triangles. At the intersection of each pair of walls, there is a generally cylindrical support leg. Each support leg reduces stresses at the acute-angle intersections of the walls and, together, the multiple support legs provide additional support, thereby reducing the tendency of the support grid to collapse under load. The support grid is bounded by a perimetric wall, which forms the sides of the substrate. Secondly, the perimetric wall of each substrate incorporates a vertical stabilization system, which prevents grout installed between the tiles from cracking and disintegrating. Half of the the perimetric wall is equipped with horizontally-disposed, projecting tabs. The other half of the perimetric wall is equipped with slots. The projecting tabs and slots engage one another when the tiles coupled together using the interlock system. The slots are designed to fit the projecting tabs with minimum vertical clearance, thereby restraining vertical movement between adjacent coupled tiles. Thirdly, each substrate is sized to precisely fit a stone, ceramic or porcelain tile. In addition, each substrate may also incorporate tile locator tabs on a pair of intersecting sides. The locator tabs facilitate the uniform positioning of a tile on each substrate. Use of the locator tabs not only ensures that each stone or ceramic tile is square with its substrate, but that the tile will not shift on the substrate as the bond between the tile and the substrate sets up and cures. After an adhesive layer has been applied to the upper surface of the substrate and a stone, ceramic, or porcelain tile has been placed on top of the adhesive layer, the assembly is positioned on a slant so that gravity and the locator tabs can work in concert to maintain correct positioning of the tile until the adhesive is cured. Alternatively, pick and place equipment employing optical scanning sensors, can accurately position a stone, ceramic, or porcelain tile on each substrate. Small amounts of hot melt glue applied at the edges of the tile can be used to maintain proper positioning of the tile until the adhesive layer has cured sufficiently to prevent movement of the tile on the substrate. Although hot-melt glue is most commonly formulated from ethylene-vinyl acetate (EVA) copolymer, it may also be formulated from amorphous polyolefins, such as polyethylene and polypropylene. It may also be formulated from polyamide, polyester, or various copolymers. In any case, high-temperature hot-melt glue is known to bond well to polyolefin materials, such as the substrates used in connection with the present invention. The invention may be practiced with tiles of different shapes, including those having rectangular and hexagonal configurations.

The toughness, rigidity, room-temperature resistance to chemicals, and abrasion resistance of certain polyolefin polymers that make them ideal materials for floor tiles also make adhesive bonding to those materials difficult. Polyolefins are known as "low energy" or "non-stick" plastics. The basically inert or inactive molecular structure of those materials is attributable to its "low energy state". It is difficult to seal or bond such materials using commonly available sealant adhesives. Cyanoacrylate, epoxy, polyurethane, RTV silicone, and most acrylic adhesives simply will not stick to untreated polyethylene, polypropylene, or polypropylene copolymer. In the past, it has been necessary to treat the surface of polyolefin materials in order to convert their low-energy state to a higher-energy state. Surface treatments included oxidation, plasma treatment, corona treatment, flame treatment, and use of a high-surface-energy primer.

Recently, 3M Corporation introduced a solvent-free, two-part, acrylic-based, structural plastic adhesive bearing the trademark Scotch-Weld® DP-8005 that allows structural bonding of polyolefins to themselves and to many other substrates. It uses a one-step process that requires no pre-treatment of the substrates other than removal of dirt and oil and a light sanding. A number of other companies have introduced similar products, and it is expected that even more adhesives for bonding polyolefins in a one-step process will be available in the future.

As a consequence of the low-energy characteristics of polyolefin thermoplastic materials, the bonding surface of each of the substrates is treated by oxidation, plasma, corona, flame, or sprayed with a high-surface-energy primer prior to the application of an adhesive layer to the surface and positioning of a tile on top of the adhesive layer. It has been determined that the use of epoxy adhesive, such as IT Devcon® two-part epoxy, applied after flame treatment of the upper surface, works well.

Once the tile subunits are assembled into a floor, grout is installed in the cracks between the tiles. For consumer-install applications, a water-based, acrylic, sanded grout has been formulated that is semi-flexible and is able to withstand a certain amount of flexing without cracking or shattering. The acrylic matrix used in the grout is similar, if not identical, to the water-based acrylic sealants that are marketed for use as tub and tile caulk in bathrooms and kitchens. Although the acrylic sealant may include silicon compounds, it is not RTV-type silicone rubber caulk. For commercial-install applications, the sanded grout may be formulated using a water-insoluble matrix, such as RTV silicone rubber or polyurethane. Although the RTV silicone rubber-based and polyurethane-based sanded grouts formulated for this application may be more durable than the water-based acrylic sanded grouts, they require much more care and expertise during application, as clean-up with water is not possible.

DETAILED DESCRIPTION OF THE INVENTION

The invention will now be described with reference to the attached drawing figures. It should be understood that the drawings are not necessarily drawn to scale and are meant to be merely illustrative of the invention. The invention may be practiced using tiles of different shapes, including those having rectangular and hexagonal configurations. FIGS. 1 through 6 disclose the manufacture and assembly of tiles having a rectangular configuration. FIGS. 7 through 12 disclose the manufacture and assembly of tiles having a hexagonal configuration.

Figure 1:
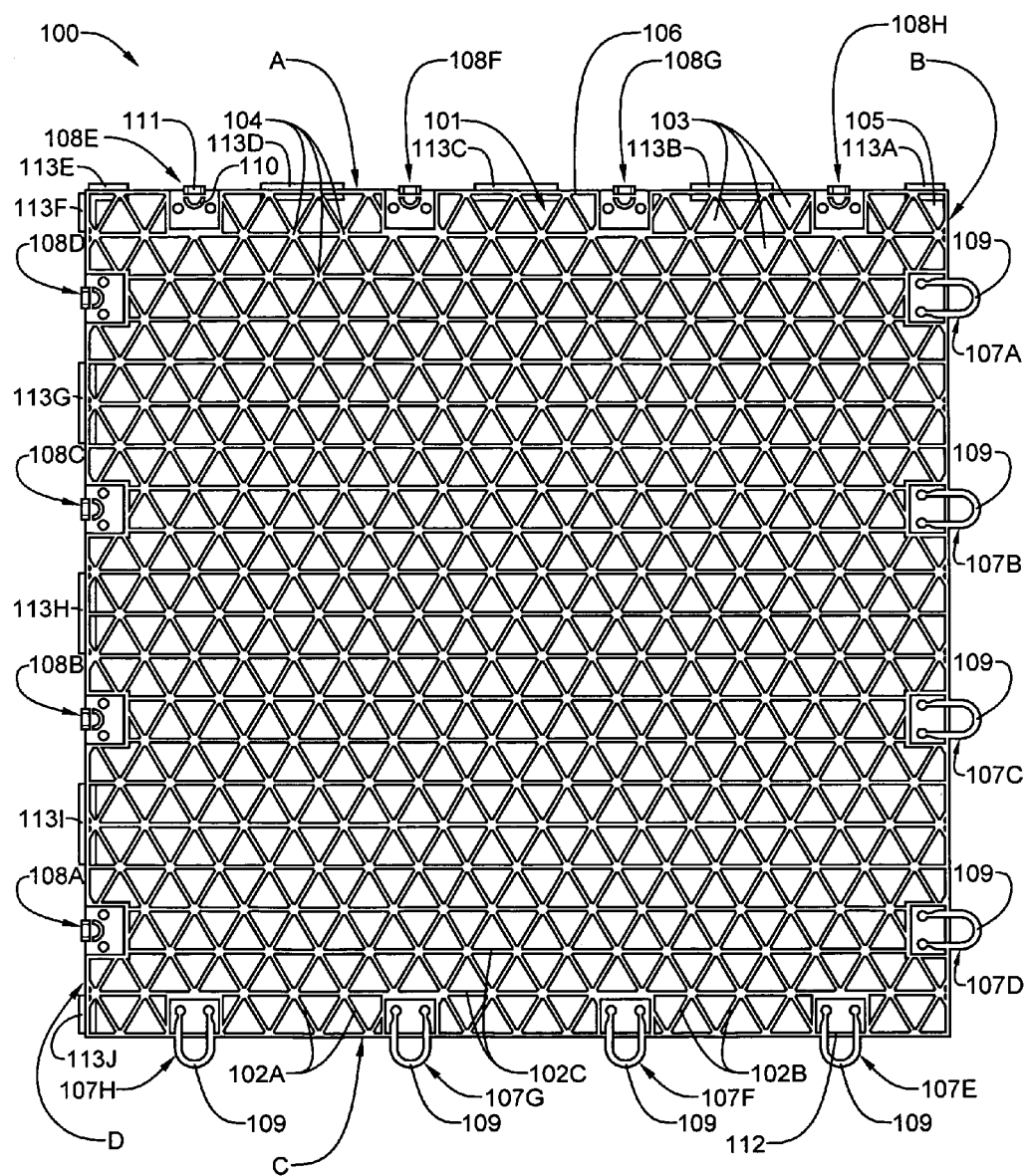
FIG. 1 is a bottom plan view of an injection molded, square polymeric plastic substrate fabricated in accordance with the present invention.

Referring now to FIG. 1, a square polymeric plastic substrate 100, fabricated in accordance with the present invention, is sized to accommodate the attachment on an upper surface thereof of a square stone, ceramic or porcelain tile. The substrate 100 is injection molded as a single piece thermoplastic material having the characteristics of exceptional toughness, stress-crack resistance, chemical resistance, and stiffness. Although these characteristics are typical of polyolefin thermoplastic materials in comparison to other thermoplastic polymers, the following polyolefins are considered the preferred materials for the application because they possess exceptional levels of the desired characteristics: low-density polyethylene (LDPE), linear low-density polyethylene (LLDPE), cross-linked high-density polyethylene (XLPE), ultra-high-molecular-weight polyethylene (UHMWPE), and polypropylene copolymer (PPCO). It will be noted that the underside of the substrate 100 incorporates support grid 101 formed by first, second and third sets of mutually intersecting walls (102A, 102B and 102C, respectively). Each set is angularly offset from the other two by 120 degrees, resulting in an array of interstitial openings 103 having the shape of equilateral triangles. At the intersection of each pair of walls, there is a generally cylindrical support leg 104. Each support leg 104 reduces stresses at the acute-angle intersections of the walls and, together, the multiple support legs provide additional support, thereby reducing the tendency of the support grid to collapse under load. The support grid 101 is capped with a square laminar sheet 105 that is unitary and coextensive with the support grid 101, and covers an upper end of each interstitial opening 103. The support grid 101 also has a square perimetric wall 106, which is also unitary with the laminar sheet, and forms the four sides A, B, C and D of the substrate 100. The substrate 100 incorporates an interlock structure about the outer perimeter, which enables reversible interconnection of the substrate 100 to other identical substrates and to other substrates of compatible shape having the same interlock structure and interlock structure spacing. The interlock structure includes both female components 107A-107H (107, generally) and male components 108A-108H (107, generally). It will be noted that each of the female components 107 includes a U-shaped member 109 that is intersected by the perimetric wall 106. Each of the male components 108 includes an arcuate member 110 and an associated locking tab 111. When an arcuate member 110 and its associated locking tab 111 are inserted into a receiving female component 107, the locking tab 111 clips over a bridging section 112 of the perimetric wall 106 which spans the U-shaped member 109. So that the locking tab 111 may clip over the bridging section 112, the bridging section 112 between each U-shaped member 109 is lower in height than the support grid 101 and the other portions of perimetric wall 106. The interlock structure enables multiple substrates 100 to be interconnected in an unbroken expanse. It should be clear that an interlock structure where interlock components of like sex are on opposite sides of the substrate 100 is also a workable arrangement for enabling multiple substrates 100 to be interconnected in an unbroken expanse. For a presently utilized embodiment of the substrate, sized for 33 cm-square (13-inch-square) tile, substrate is about 0.375 inch thick, the interstitial openings are about 0.3125 inch deep, the laminar sheet 104 is about 0.0625 inch thick, the walls are about 0.625 inch thick, the support legs are about 0.155 inch in diameter, and the U-shaped members 109 of the female interlock components are about 0.625 inches in width, about 0.12 inch thick, about 0.20 inches in height, and project about 0.460 inch from the perimetric wall 106.

Still referring to FIG. 1, the perimetric wall 106 of each substrate incorporates a vertical stabilization system, which prevents grout installed between the tiles from cracking and disintegrating. Half of the the perimetric wall 106 is equipped with horizontally-disposed, projecting tabs 113A through 113J (generally 113). The other half of the perimetric wall is equipped with slots (not visible in this drawing). The projecting tabs and slots engage one another when the tiles coupled together using the interlock system. The slots are designed to fit the projecting tabs with minimum vertical clearance, thereby restraining vertical movement between adjacent coupled tiles. Although only the projecting tabs 113A through 113J are visible in this view, they and the slots will be shown and described more fully with reference to FIGS. 7 and 8.

Figure 2:
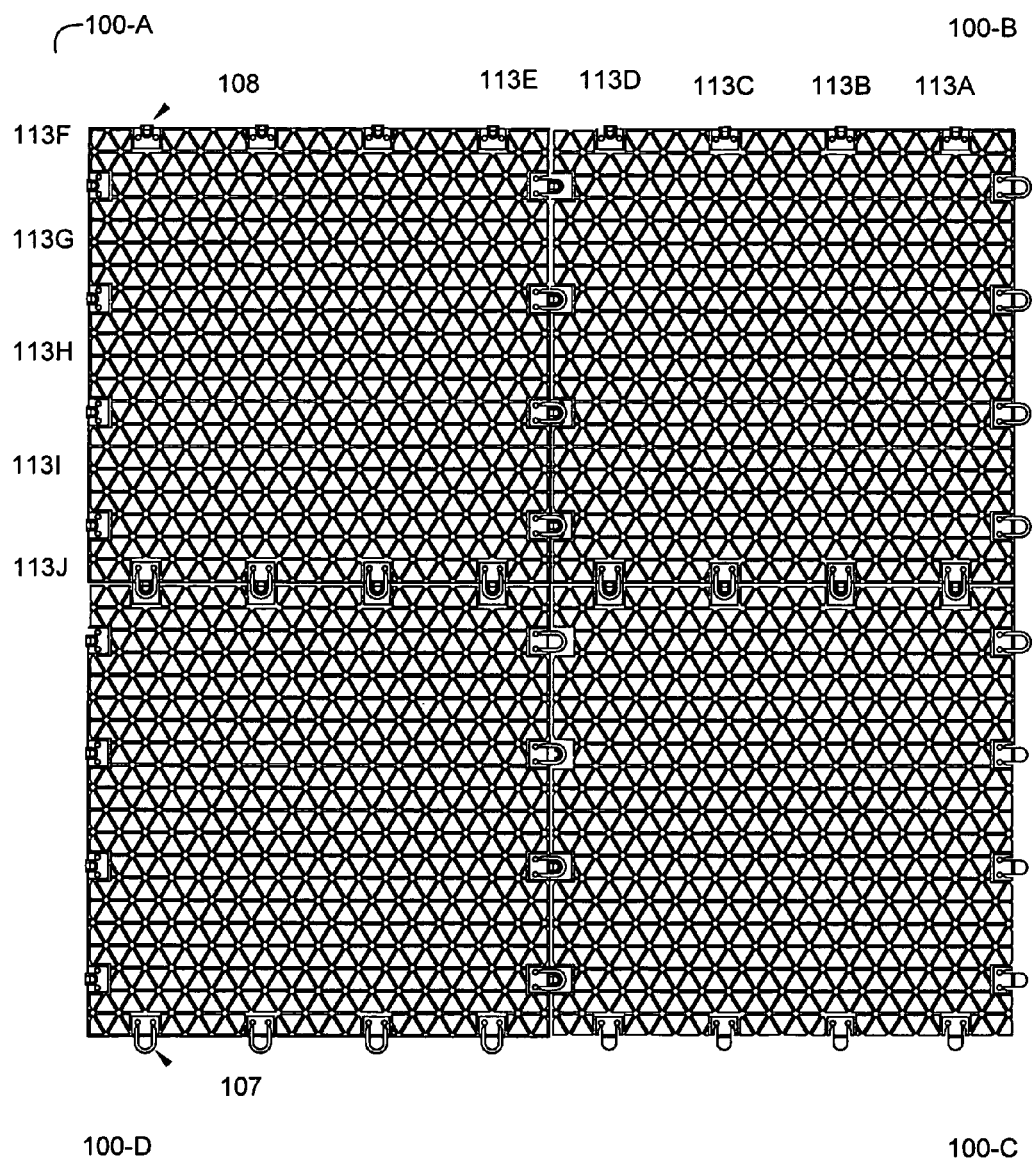
FIG. 2 is a partial bottom plan view of four interconnected, square polymeric plastic substrates.

Referring now to FIG. 2, four square polymeric plastic substrates 100-A, 100-B, 100-C and 100-D have been interconnected by engaging the male components 108 of the interlock structure with the female components 107 thereof.

Figure 3:
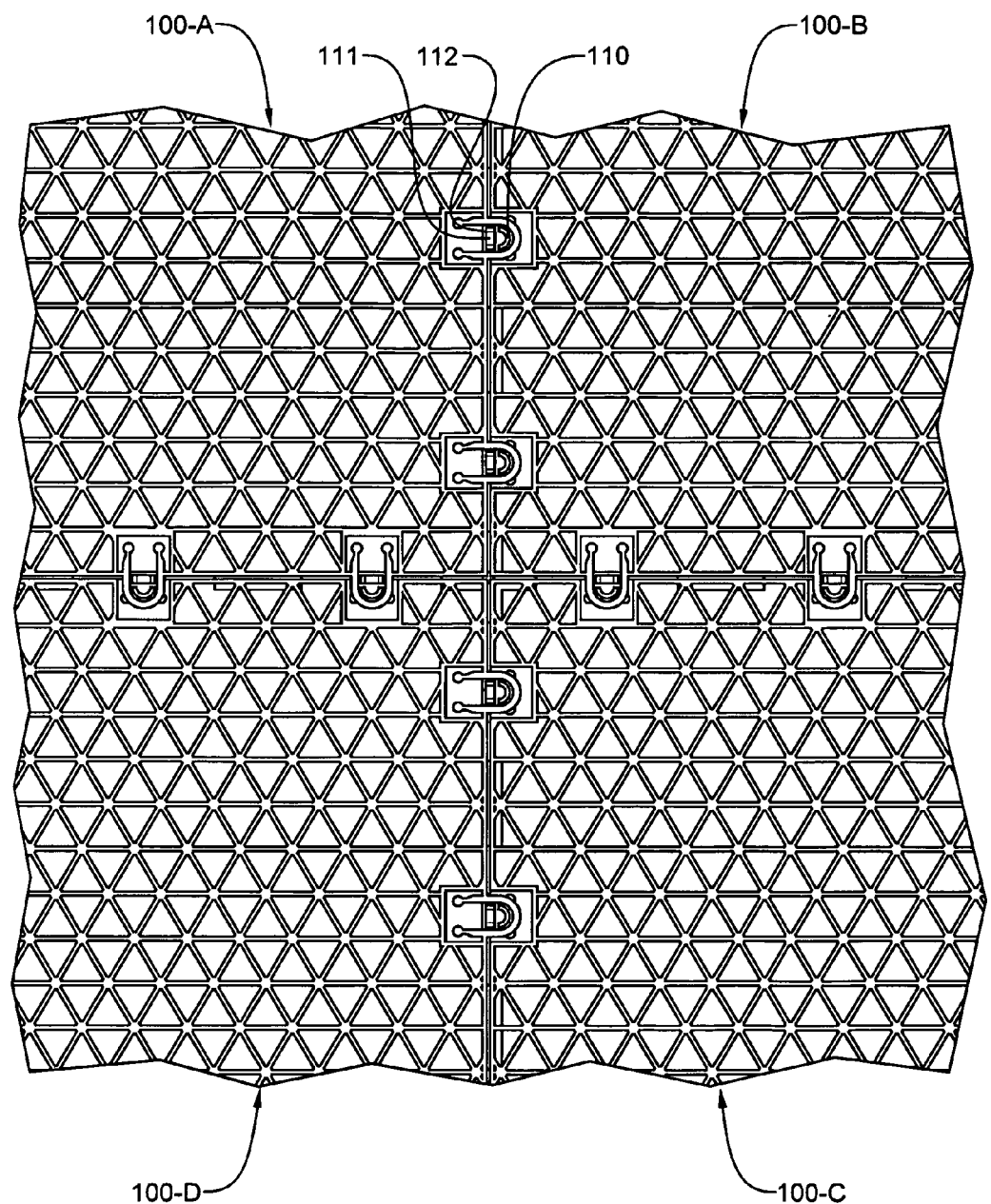
FIG. 3 is enlarged partial bottom plan view of the four interconnected, square polymeric plastic substrates of FIG. 2.

Referring now to FIG. 3, this close-up view of a central portion of the four interconnected square polymeric plastic substrates 100 of FIG. 2 shows, in more easily visible detail, the interlock interconnections between the four substrates 100-A, 100-B, 100-C and 100-D. It will be noted that at each male-to-female interlock engagement, the arcuate member 110 and associated locking tab 111 of each male component 108 is positioned within a U-shaped member 109 of a female interlock component 107, and that the locking tab 111 is clipped over the bridging section 112 of the perimetric wall 106 that spans the gap between the U-shaped member 109.

Figure 4:
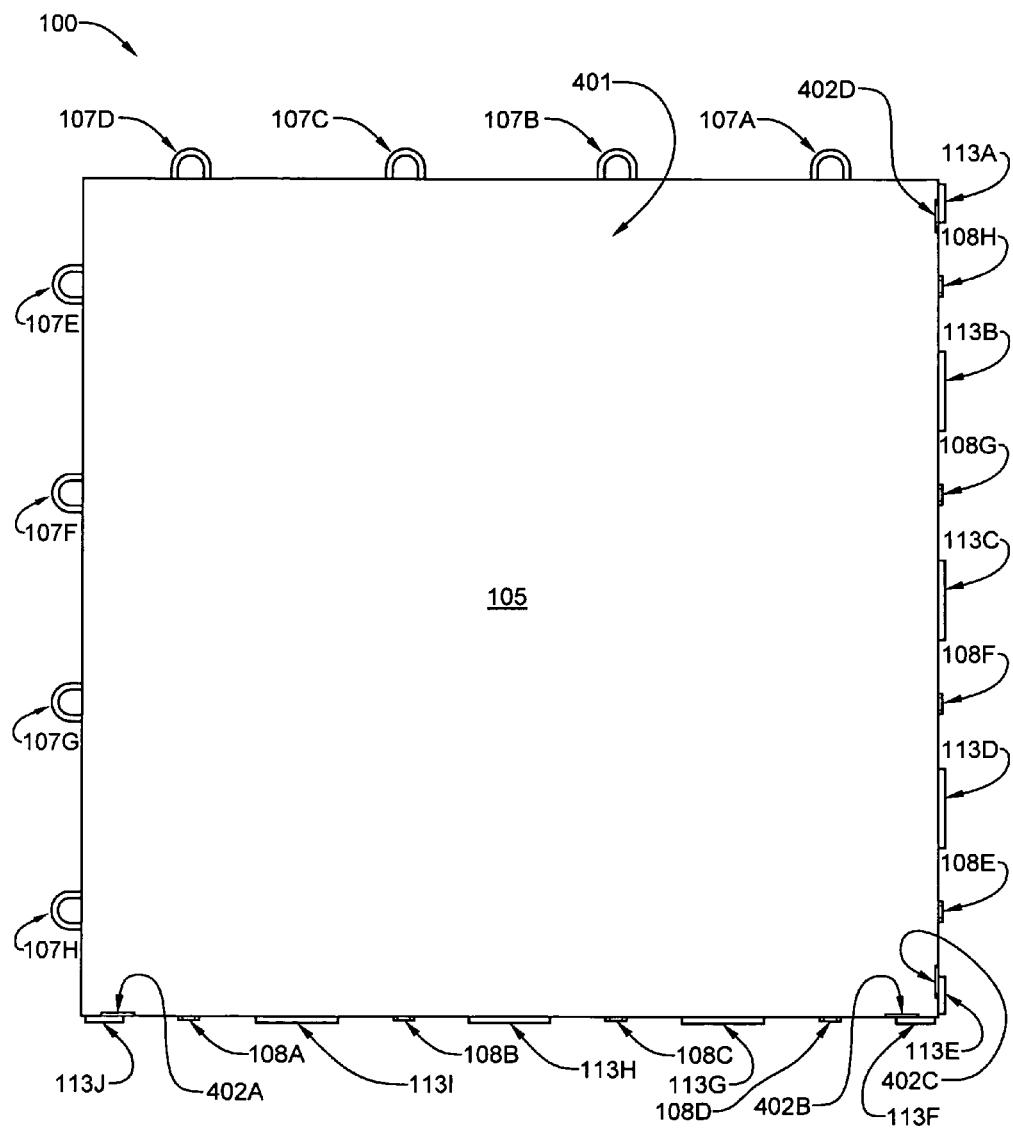
FIG. 4 is a top plan view of a single square polymeric plastic substrate.

Referring now to FIG. 4, a single square polymeric plastic substrate 100 is seen from the top. All that is visible in this view are the upper surface 401 of the laminar sheet 105, the U-shaped member 109 of each female interlock component 107, the locking tab 111 of each male interlock component 108, and four, upwardly projecting locator tabs 402A, 402B, 402C and 402D (402, generally), which are positioned at the very edges of a pair of intersecting sides B and C of substrate 100. The locator tabs 402 facilitate the uniform positioning of a stone, ceramic or porcelain tile on each substrate, as will be subsequently explained. In the past, it has been necessary to treat the surface of polyolefin materials in order to convert their low-energy state to a higher-energy state. Surface treatments included oxidation, plasma treatment, corona treatment, flame treatment, and use of a high-surface-energy primer. If the tile is to be bonded to the upper surface 401 of the laminar sheet 105 using a specially-formulated adhesive, such as 3M Scotch-Weld® DP-8005, that allows structural bonding of polyolefins to themselves and to many other substrates, then no preliminary surface treatment of the upper surface 401 is required. However, if the tile is to be bonded to the upper surface 401 of the laminar sheet 105 with a conventional adhesive, such as epoxy, then it is necessary to treat the upper surface 401 in order the convert the surface molecules from a low-energy state to a higher-energy state that is more suitable for adhesive bonding within a normal range for room temperature. Surface treatments include oxidation, plasma treatment, corona treatment, flame treatment, and use of a high-surface-energy primer. Flame treatment has been used successfully for commercially-available product manufactured in accordance with the present invention. Flame treatment can be performed with a flame spreader, and using a flame fueled by propane. The flame includes a blue primary portion and a faint yellow secondary portion. The flame is adjusted so that the primary flame is contained with the spreader, and the secondary flame is about 1½" beyond the spreader. The entire exposed supper surface 401 of the laminar sheet 105 can be subjected to a single automated stroke by the secondary flame that will provide sufficient flame for high-energy-state conversion over the entire surface. Alternatively, the entire exposed upper surface 401 of the laminar sheet 105 can be subjected to multiple gentle strokes, with total exposure to the flame at any point on the surface being about 2 to 3 strokes. Using either exposure method, the secondary flame should not deform or melt the polyolefin surface in any way. Effective treatment of the upper surface 401 can be tested by wetting it with water. If the water runs off immediately, the treatment was not effective. However, if the water effectively wets the surface 401 as an uninterrupted sheet, the surface, one dry, is ready for bonding.

Figure 5:
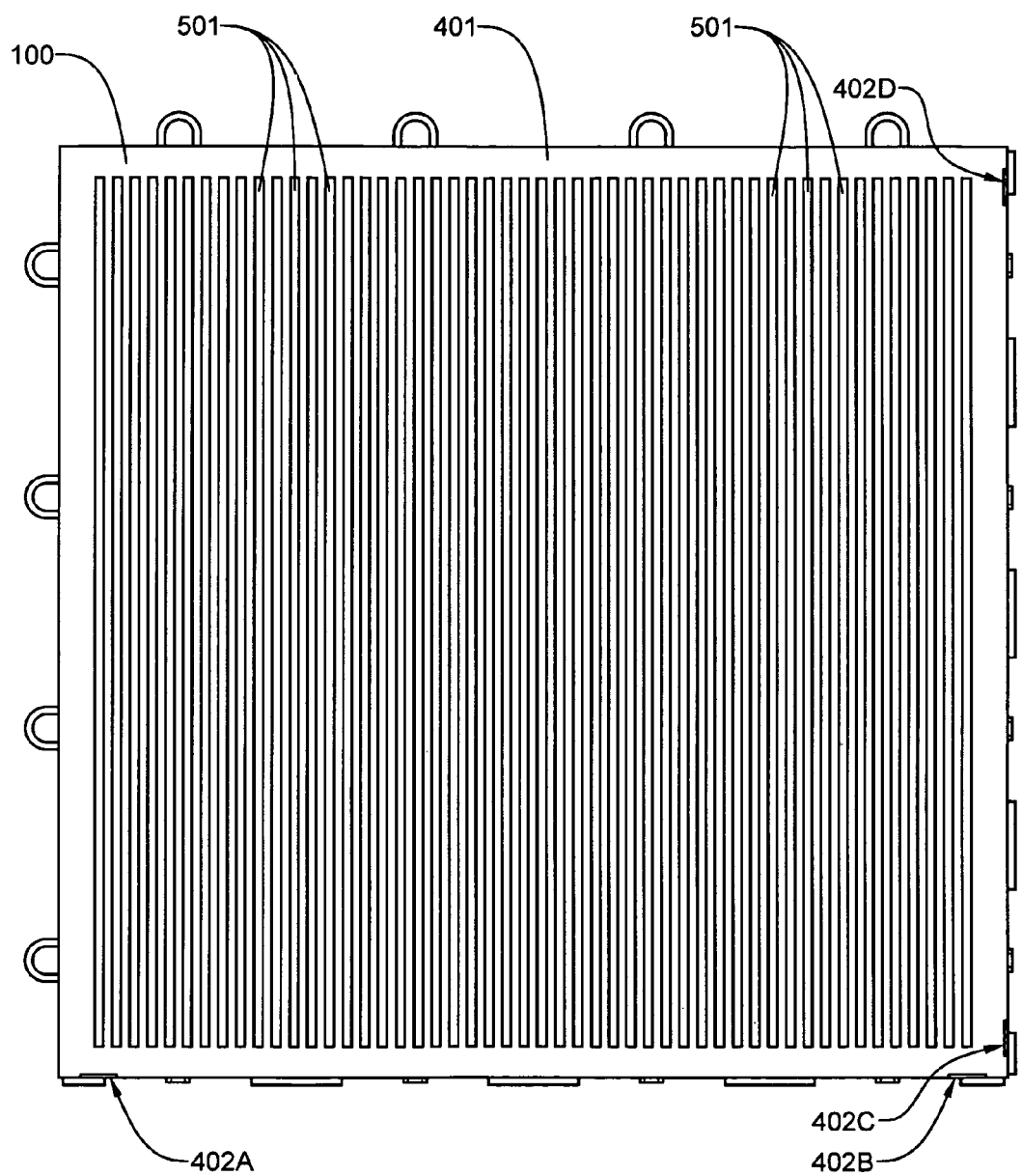
FIG. 5 is a top plan view of the square polymeric plastic substrate of FIG. 4, following the application of adhesive to the upper surface thereof.

Referring now to FIG. 5, epoxy adhesive has been spread in a striped pattern 501 on the now-treated surface 401.

Figure 6:
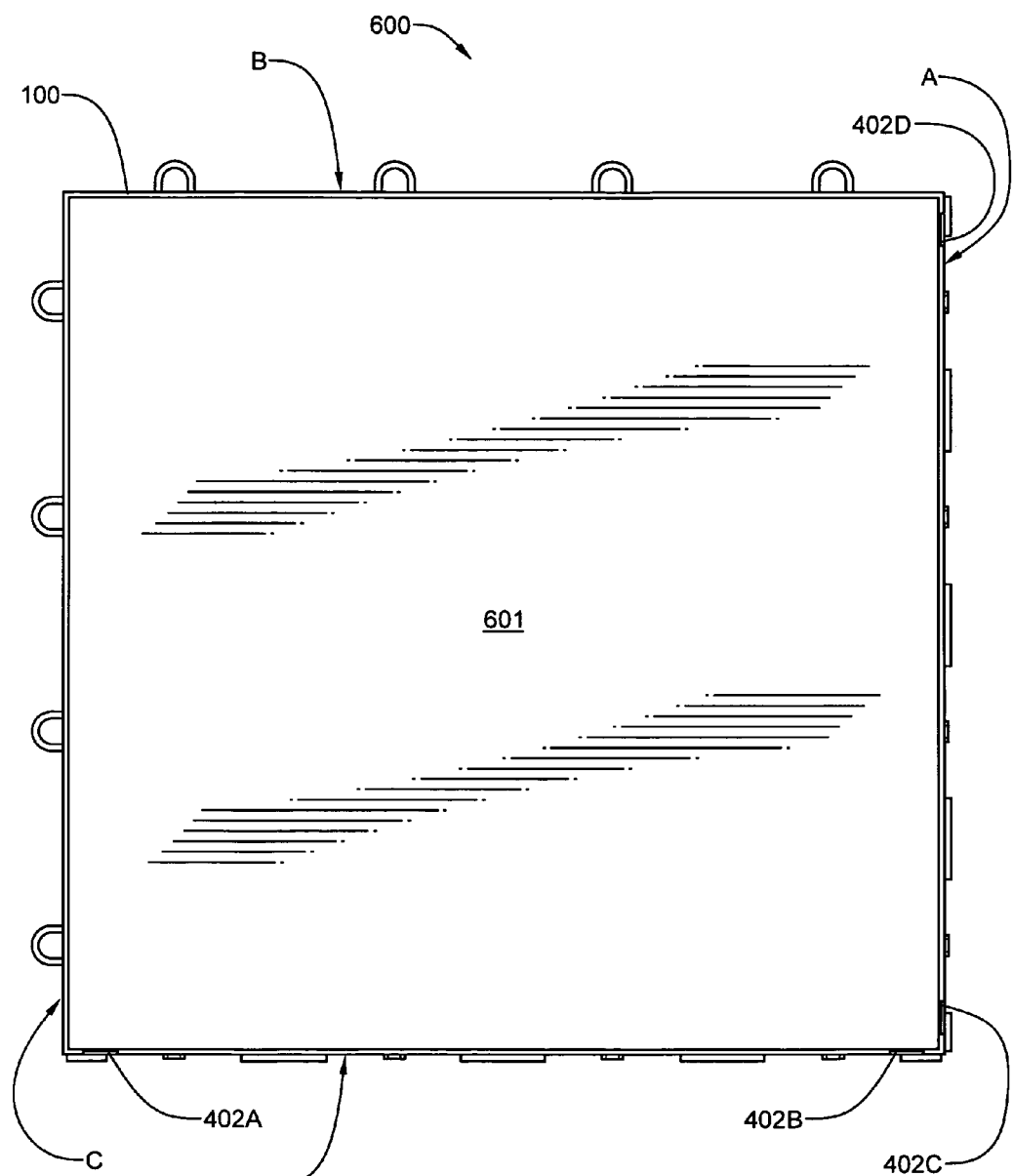
FIG. 6 is a top plan view of a square tile subunit, which includes a substrate on which has been adhesively bonded a square stone, ceramic, or porcelain tile.

Referring now to FIG. 6, a complete square subunit 600 has been created by placing a square stone, ceramic, or porcelain tile 601 atop the striped pattern 502 of applied uncured epoxy. Once the tile 601 has been positioned so that it is approximately centered on the substrate 100, but within the confines four, upwardly projecting locator tabs 402, the subunit 600 is placed, with the tile 601 above the substrate 100, on a rack having a slant within a range of about 30 to 45 degrees for the epoxy adhesive 501 to cure. In this slanted position, the corner A-D of the subunit, which corresponds to the intersection of sides A and D, is at the highest elevation, corner B-C, which corresponds to the intersection of sides B and C is at the lowest elevation, and corners A-B and C-D, which correspond to the intersection of side A with side B and side C with side D, respectively, are generally at the same elevation. When the epoxy adhesive 501 has cured, the force of gravity will ensure that the tiles 601 are uniformly positioned on their associated substrates 100. Assuming that each tile 601 is perfectly square, uniformly positioned means that each edge of each tile will be parallel to the underlying edge on its associated substrate 100, and that the edges of the tile which are adjacent the upwardly projecting locator tabs 402, will be equidistantly spaced from the respective underlying edges of the associated substrate 100 and that the edges of the tile which not adjacent the upwardly projecting locator tabs 402 will also be equidistant from the respective underlying edges of the associated substrate 100. Because tiles vary slightly in dimension from batch to batch, as well as from manufacturer to manufacturer, the tiles 601 may not be perfectly centered on their associated substrates 100. However, the slight offset is generally undetectable when the floor is laid. Nevertheless, this effect can be mitigated using pick and place equipment employing optical scanning and measurement sensors to accurately center a tile 601 on a substrate 100, with the edges of the tile 601 being equidistant from the edges of the substrate 100. Once pressure has been applied to the tile 601 in order to optimize contact with the striped pattern 502 of epoxy adhesive 501, small amounts of hot melt glue, which are almost invisible to the naked eye, can be applied at the edges of the tile 601 in order to maintain proper positioning of the tile 601 until the epoxy adhesive 501 has cured sufficiently to prevent movement of the tile 601 on the substrate 100. Hot melt glue is generally formulated from amorphous polypropylene, and is known to bond well to other polyolefin materials.

Figure 7:
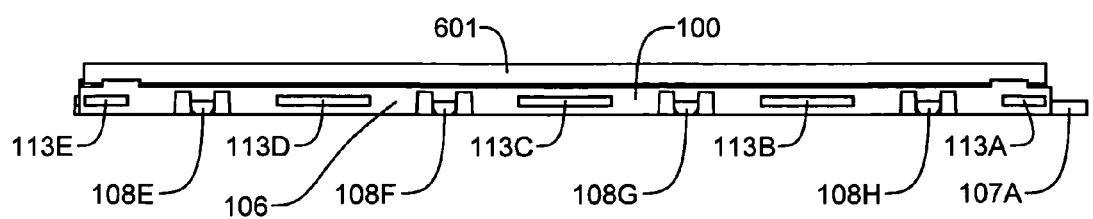
FIG. 7 is a side elevational view of a square subunit, positioned such that a portion of the perimetric wall equipped with horizontally-disposed, projecting tabs is shown.
Figure 8:
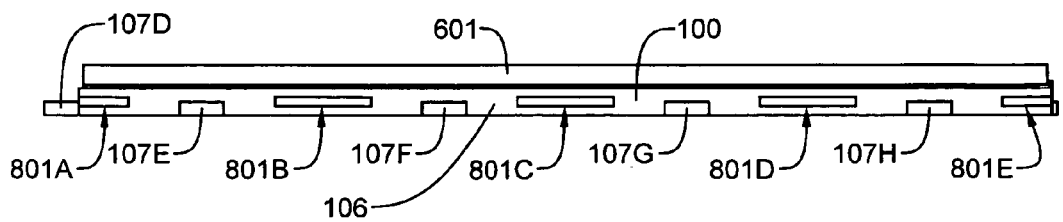
FIG. 8 is a side elevational view of a square subunit, positioned such that a portion of the perimetric wall equipped with slots is shown.

Referring now to FIG. 7, this side view of a complete subunit 600, including a square stone, ceramic, or porcelain tile 601 bonded to a substrate 100, shows the vertical stabilization system previously described with reference to FIG. 1, from a different perspective. A first half of the perimetric wall 106, a portion of which is visible in FIG. 7, incorporates horizontally-disposed projecting tabs. The other half, a portion of which is shown in FIG. 8, incorporates slots which engage the projecting tabs. In that portion of the perimetric wall 106 shown in FIG. 7 five horizontally-disposed, projecting tabs 113A, 113B, 113C, 113D and 113E (113 generally)

project from the perimetric wall 106. It will be noted that projecting tabs 113A and 113E, because they are near the corners of the substrate 100, are narrower than projecting tabs 113B, 113C and 113D.

Referring now to FIG. 8, a portion of the perimetric wall 106 of substrate 100 is shown which incorporates slots 801A, 801B, 801C, 801D and 801E (801 generally). Each of the slots 801 engages a projecting tab 113 with minimum vertical clearance when the appropriate edges of two subunits 600 are interlocked together, thereby restraining vertical movement between adjacent coupled tiles and thereby preventing the flexible, sanded grout specially formulated for this application from cracking. It will be noted that slots 801A and 801E extend to the edge of the substrate 100 and that the projecting tabs 113A and 113E shown in FIG. 7 are positioned a distance from the edge of the substrate 100 that is equal to the extension depth of a tab 113 when it is inserted within a slot 801. This arrangement allows the tile subunits 600 to be installed in a staggered arrangement, with the middle projecting tab 113C of one subunit 600 bridging a pair of adjacent staggered subunits 600.

Figure 9:
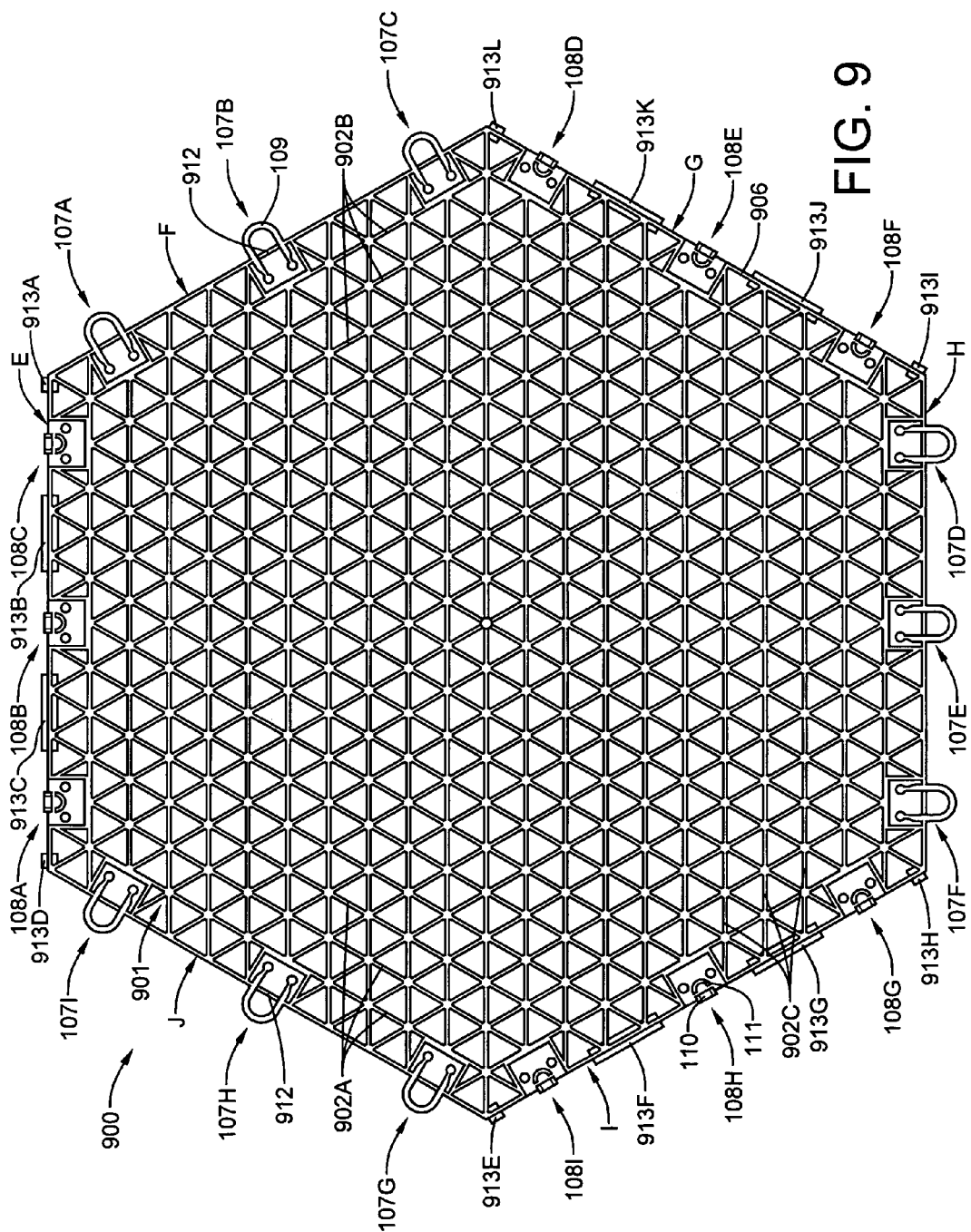
FIG. 9 is bottom plan view of an injection molded, hexagonal polymeric plastic substrate fabricated in accordance with the present invention.

Referring now to FIG. 9, a hexagonal polymeric plastic substrate 900, fabricated in accordance with the present invention, is sized to accommodate the attachment on an upper surface thereof of a hexagonal stone, ceramic or porcelain tile. Like the square substrate 100 of FIG. 1, the hexagonal substrate 900 is injection molded as a single piece preferably from the same polyolefin thermoplastic materials, and the support grid 901 is also formed by first, second and third sets of mutually intersecting walls (902A, 902B and 902C, respectively). Also as is the case with the square substrate, each set of walls is angularly offset from the other two by 120 degrees, resulting in an array of interstitial openings 103 having the shape of equilateral triangles, and at the intersection of each pair of walls, there is a generally cylindrical support leg 104. The support grid 901 is capped with a hexagonal laminar sheet 905 that is unitary and coextensive with the support grid 901. The support grid 901 also has a hexagonal perimetric wall 906, which is also unitary with the laminar sheet, and forms the six sides E, F, G, H, I and J of the hexagonal substrate 900. Also like the square substrate 100, the hexagonal substrate 900 incorporates an interlock structure about the outer perimeter, which is essentially identical to that of the square substrate 100. In this case, nine female components 107A-1071 (107, generally) are distributed so that three are located on each of three alternating sides E, G and I. Nine male components 108A-1081 (107, generally) are located on the other three sides F, H and J. As with the square substrate, each of the female components 107 includes a U-shaped member 109 that is intersected by (in this case) the hexagonal perimetric wall 906. Each of the male components 108 includes an arcuate member 110 and an associated locking tab 111. When an arcuate member 110 and its associated locking tab 111 are inserted into a receiving female component 107, the locking tab 111 clips over a bridging section 912 of the hexagonal perimetric wall 906 which spans the U-shaped member 109. So that the locking tab 111 may clip over the bridging section 912, the bridging section 912 between each U-shaped member 109 is lower in height than the support grid 901 and the other portions of perimetric wall 906. The interlock structure of the hexagonal substrate 900 functions in exactly the same manner as does the interlock structure of the square substrate 100, thereby enabling multiple hexagonal substrates 900 to be interconnected in an unbroken expanse. The reader should be able to convince himself that an interlock structure where interlock components of like sex are three adjoining sides (for example female components 107 located on sides E, F and G and male components 108 located on sides H, I and J) is also a workable arrangement for enabling multiple hexagonal substrates 900 to be interconnected in an unbroken expanse. For a hexagonal substrate 900 that is, for example, 8.1 inches on a side, the substrate is about 0.375 inch (about 9.5 mm) thick, the interstitial openings are about 0.3125 inch deep, the laminar sheet 104 is about 0.0625 inch thick, the walls are about 0.625 inch thick, the support legs are about 0.155 inch in diameter, and the U-shaped members 109 of the female interlock components are about 0.625 inches in width, about 0.12 inch thick, about 0.20 inches in height, and project about 0.460 inch from the perimetric wall 906.

Still referring to FIG. 9, and as with the square substrates 100 heretofore described, the perimetric wall 906 of each hexagonal substrate 900 also incorporates a vertical stabilization system, which prevents grout installed between the tiles from cracking and disintegrating. Half of the the perimetric wall 906 is equipped with horizontally-disposed, projecting tabs 913A through 913L. The other half of the perimetric wall is equipped with slots (not visible in this drawing). The projecting tabs and slots engage one another when the tiles coupled together using the interlock system. The slots are designed to fit the projecting tabs with minimum vertical clearance, thereby restraining vertical movement between adjacent coupled tiles. Although only the projecting tabs 913A through 113L are visible in this view, they and the slots will be shown and described more fully with reference to FIGS. 15 and 16.

Figure 10:
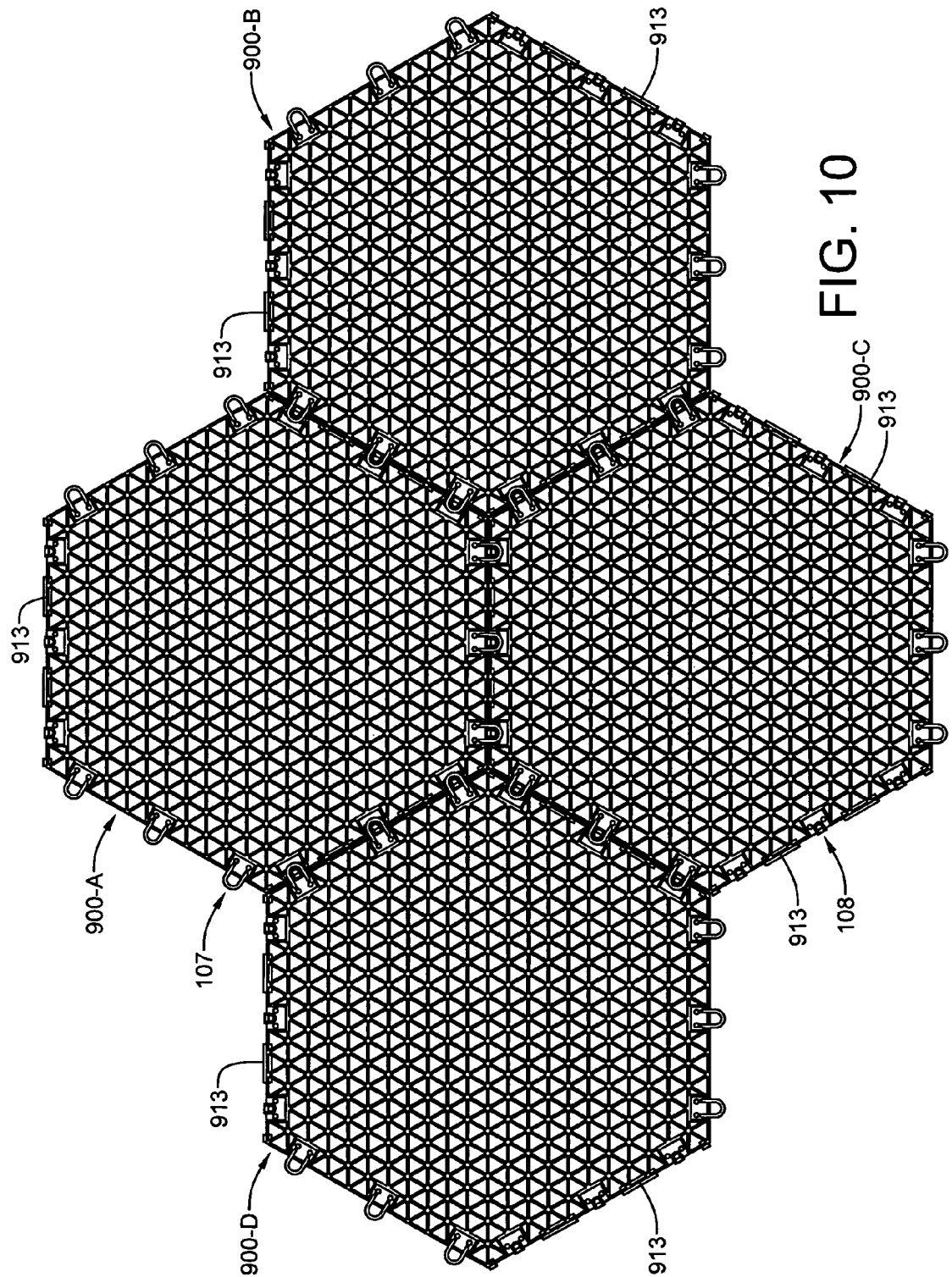
FIG. 10 is a bottom plan view of four interconnected, hexagonal polymeric plastic substrates.

Referring now to FIG. 10, four hexagonal polymeric plastic substrates 900-A, 900-B, 900-C and 900-D have been interconnected by engaging the male components 108 of the interlock structure with the female components 107 thereof.

Figure 11:
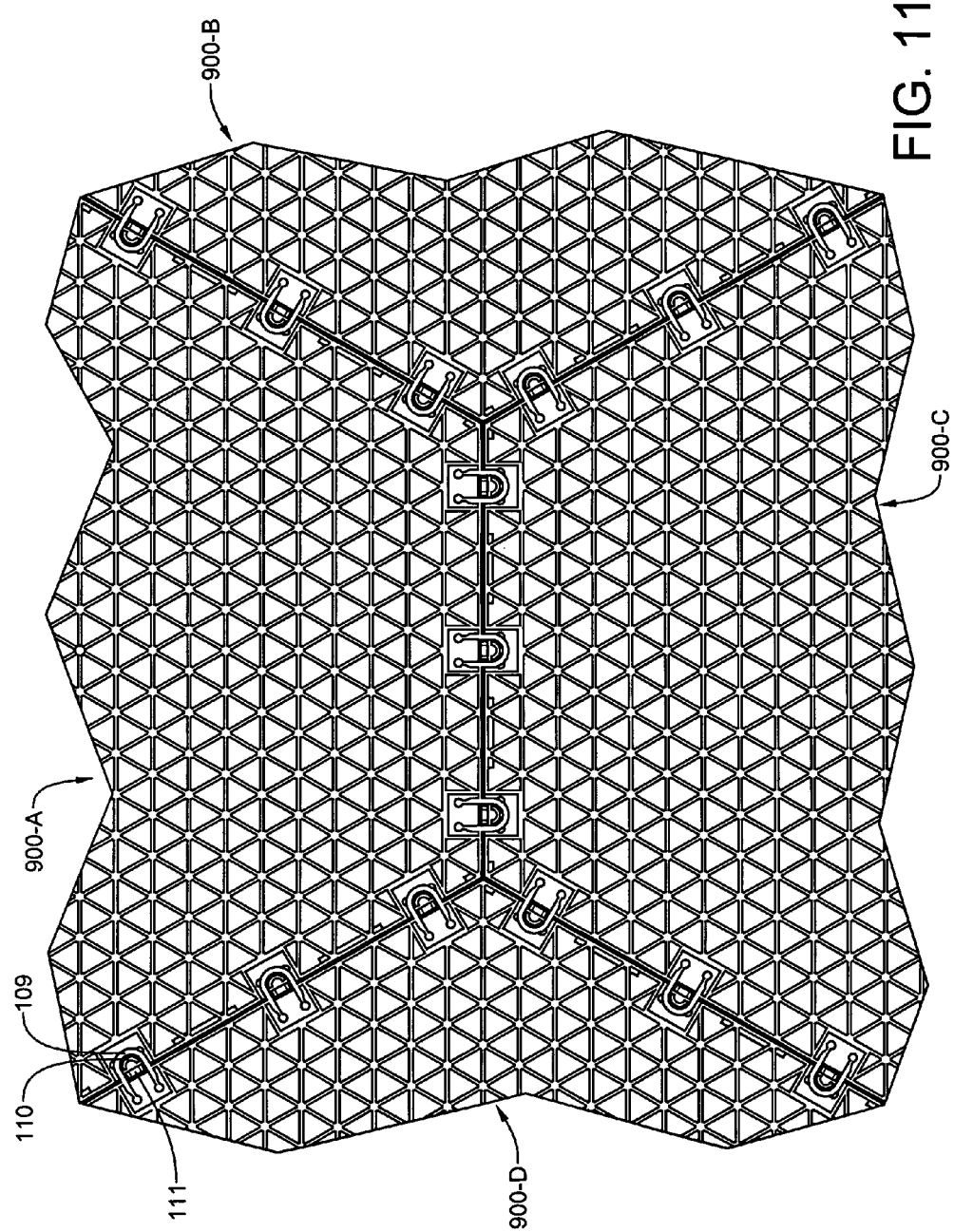
FIG. 11 is enlarged partial bottom plan view of the four interconnected, hexagonal polymeric plastic substrates of FIG. 8.

Referring now to FIG. 11, this close-up view of a central portion of the four interconnected hexagonal polymeric plastic substrates 900 of FIG. 8 shows, in more easily visible detail, the interlock interconnections between the four substrates 900-A, 900-B, 900-C and 900-D. It will be noted that at each male-to-female interlock engagement, the arcuate member 110 and associated locking tab 111 of each male component 108 is positioned a U-shaped member 109 of a female interlock component 107, and that the locking tab 111 is clipped over the bridging section 912 of the perimetric wall 906 that spans the gap between the U-shaped member 109.

Figure 12:
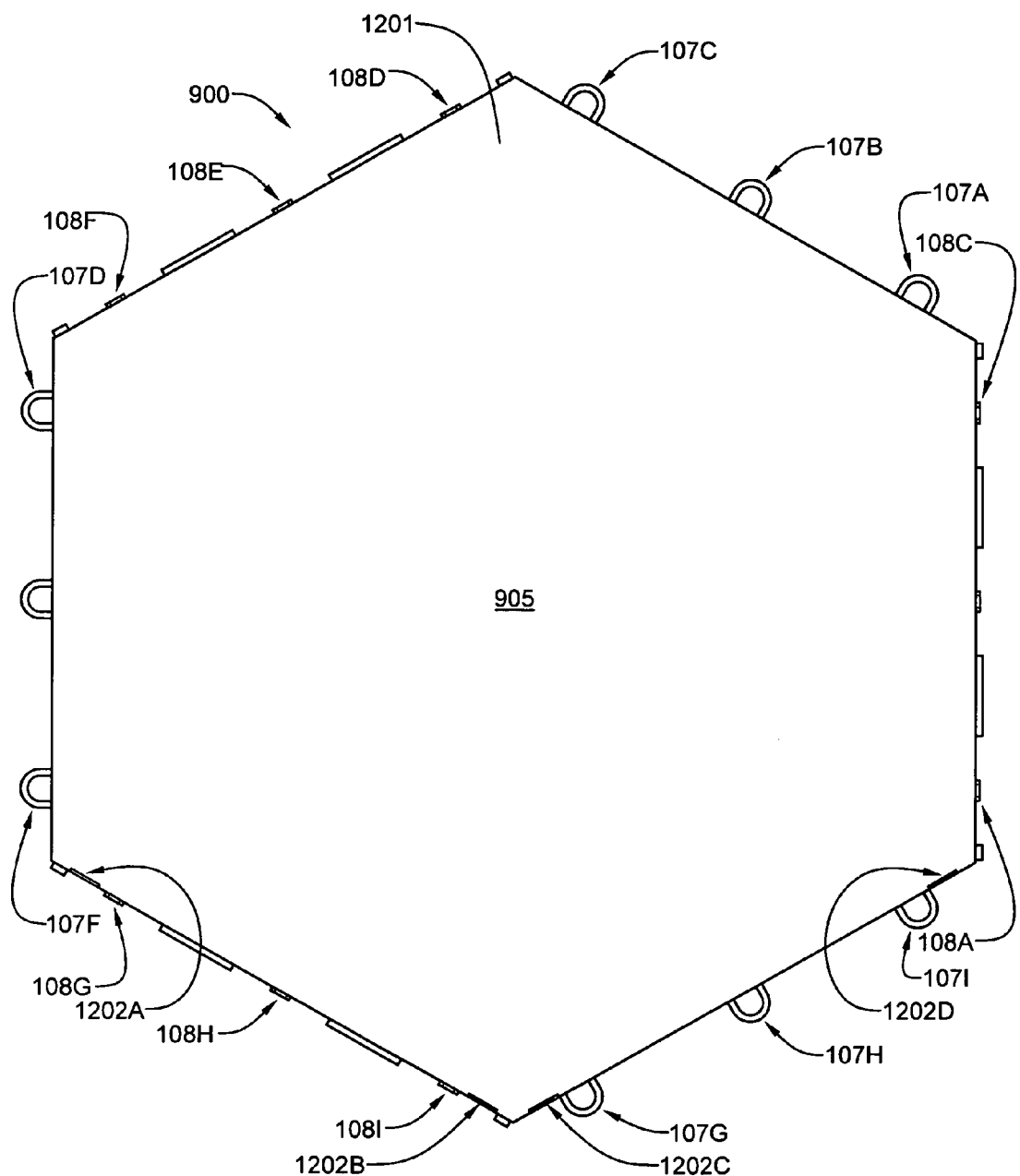
FIG. 12 is a top plan view of a single hexagonal polymeric plastic substrate.

Referring now to FIG. 12, a single hexagonal polymeric plastic substrate 900 is seen from the top. All that is visible in this view are the upper surface 1201 of the hexagonal laminar sheet 905, the U-shaped member 109 of each female interlock component 107, the locking tab 111 of each male interlock component 108, and four, upwardly projecting locator tabs 1202A, 1202B, 1202C and 1202D (1202, generally), which are positioned on a pair of adjacent sides of the substrate 900. Treatment of the upper surface Bonding of the tile to the In the past, it has been necessary to treat the surface of polyolefin materials in order to convert their low-energy state to a higher-energy state. Surface treatment of the upper surface 1201 of the hexagonal substrate 900 is performed in the same manner as previously detailed for the square substrates 100.

Figure 13:
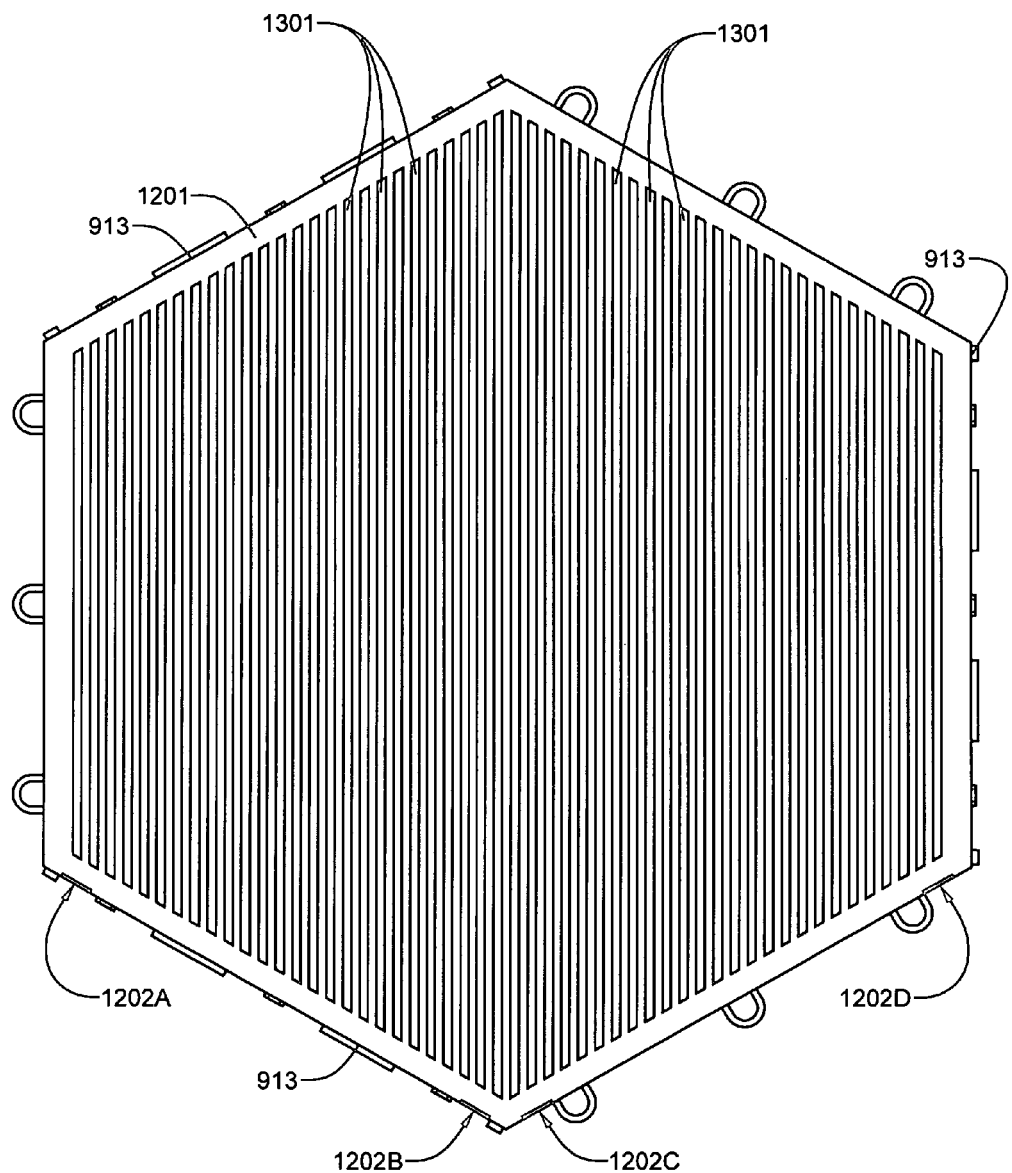
FIG. 13 is a top plan view of the hexagonal polymeric plastic substrate of FIG. 10, following the application of adhesive to the upper surface thereof.

Referring now to FIG. 13, epoxy adhesive has been spread in a striped pattern 1301 on the upper surface 1201 of the hexagonal substrate 900 after flame treatment or other comparable surface treatment.

Figure 14:
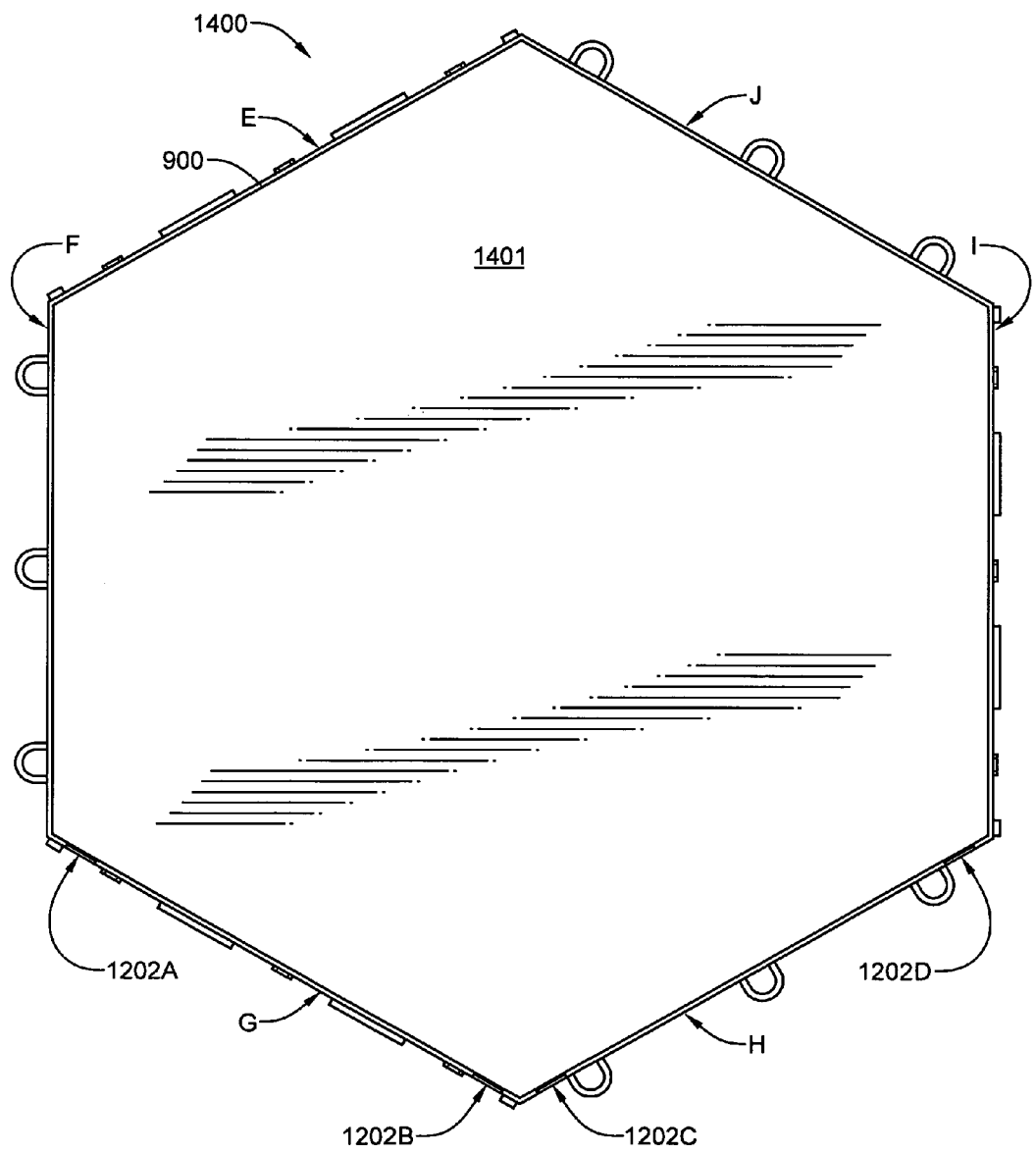
FIG. 14 is a top plan view of a tile subunit, which includes a hexagonal substrate on which has been adhesively bonded a hexagonal stone, ceramic, or porcelain tile.

Referring now to FIG. 14, a complete hexagonal subunit 1400 has been created by placing a hexagonal stone, ceramic, or porcelain tile 1401 atop the striped pattern 1302 of applied uncured epoxy. Once the tile 1401 has been positioned so that it is approximately centered on the substrate 900, but within the confines four, upwardly projecting locator tabs 1202, the subunit 1400 is placed, with the tile 1401 above the substrate 900, on a rack having a slant within a range of about 30 to 45 degrees for the epoxy adhesive 501 to cure. In this slanted position, the corner E-J of the subunit 900, which corresponds to the intersection of sides E and J, is at the highest elevation, corner G-H, which corresponds to the intersection of sides G and H is at the lowest elevation, and corners E-F and I-J, which correspond to the intersection of side E with side F and side I with side J, respectively, are generally at the same elevation. When the epoxy adhesive 501 has cured, the force of gravity will ensure that the tiles 1401 are uniformly positioned on their associated substrates 900. Assuming that each tile is perfectly hexagonal, uniformly positioned means that each edge of each tile 1401 will be parallel to the underlying edge on its associated substrate 900, and that the edges of the tile which are adjacent the upwardly projecting locator tabs 1202, will be equidistantly spaced from the respective underlying edges of the associated substrate 900 and that the edges of the tile which not adjacent the upwardly projecting locator tabs 1002 will also be equidistant from the respective underlying edges of the associated substrate 900. Because tiles vary slightly in dimension from batch to batch, as well as from manufacturer to manufacturer, the tiles 1401 may not be perfectly centered on their associated substrates 900. However, the slight offset is generally undetectable when the floor is laid. Nevertheless, this effect can be mitigated using pick and place equipment employing optical scanning and measurement sensors to accurately center a tile 1401 on a substrate 900, with the edges of the tile 1401 being equidistant from the edges of the substrate 900. Once pressure has been applied to the tile 1401 in order to optimize contact with the striped pattern 1302 of epoxy adhesive 501, at least two small dabs of hot-melt glue, which are almost invisible to the naked eye, can be applied at the edges of the tile 1401 in order to maintain proper positioning of the tile 1401 until the epoxy adhesive 501 has cured sufficiently to prevent movement of the tile 1401 on the substrate 900.

Figure 15:
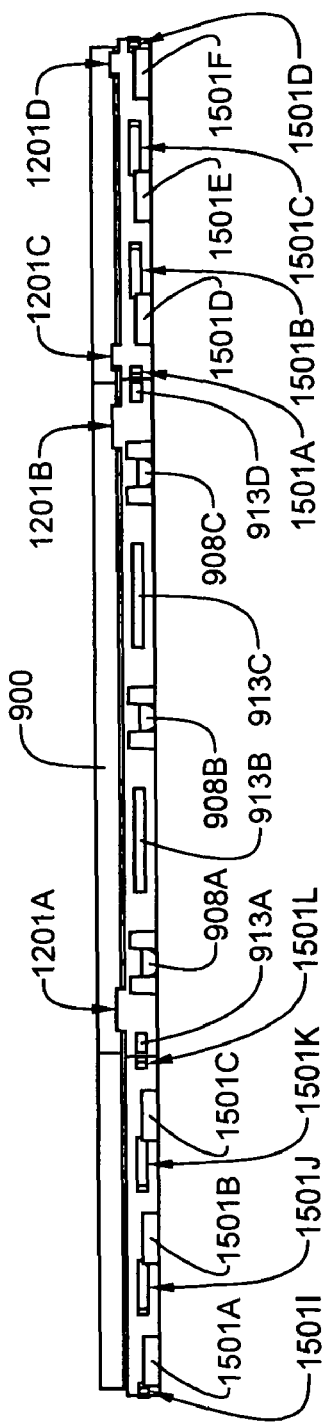
FIG. 15 is a side elevational view of a hexagonal subunit, positioned such that a centrally-projected portion of the perimetric wall equipped with horizontally-disposed, projecting tabs is shown.

Referring now to FIG. 15, this side view of a complete subunit 1400, including a square stone, ceramic, or porcelain tile 1401 bonded to a substrate 900, shows the vertical stabilization system previously described with reference to FIG. 9, from a different perspective. A first half of the perimetric wall 906, such a portion of which is shown in the central part of FIG. 15, incorporates horizontally-disposed projecting tabs 913. The other half incorporates slots which engage the projecting tabs 913. In that portion of the perimetric wall 906 shown in FIG. 15 four horizontally-disposed, projecting tabs 913A, 913B, 913C, and 913D project from the perimetric wall 906. It will be noted that projecting tabs 913A and 913D, because they are near the corners of the substrate 900, are narrower than projecting tabs 913B and 913C. It will also be noted that slots 1501A, 1501B, 1501C, and 1501D can be seen on the portion of the perimetric wall 901 to the left of the central portion of the perimetric wall 906 which incorporates the projecting tabs 913A through 913D, and slots 1501E, 1501F, 1501G and 1501H can be seen on the portion of the perimetric wall 901 to the right of the central portion of the perimetric wall 906 which incorporates the projecting tabs 913A through 913D.

Figure 16:
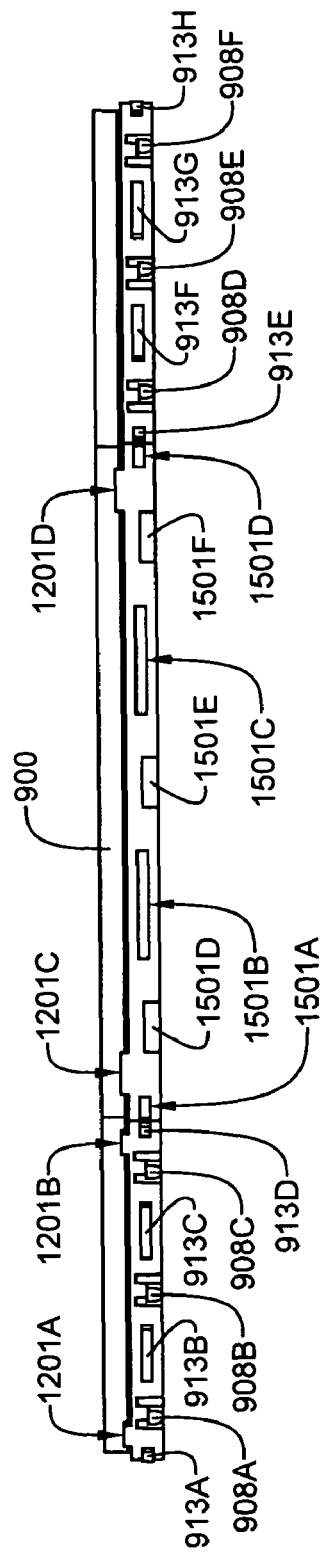
FIG. 16 is a side elevational view of a hexagonal subunit, positioned such that a centrally-projected portion of the perimetric wall equipped with slots is shown.

Referring now to FIG. 16, the subunit 1400 of FIG. 15 has been rotated clockwise 30 degrees so that the right portion of the perimetric wall 906 containing slots 1501A through 1501D is how in the center of the drawing. Each of the slots 1501 will engage a projecting tab 913 with minimum vertical clearance when the appropriate edges of two subunits 1400 are interlocked together, thereby restraining vertical movement between adjacent coupled tiles and thereby preventing the flexible, sanded grout specially formulated for this application from cracking.

Figure 17:
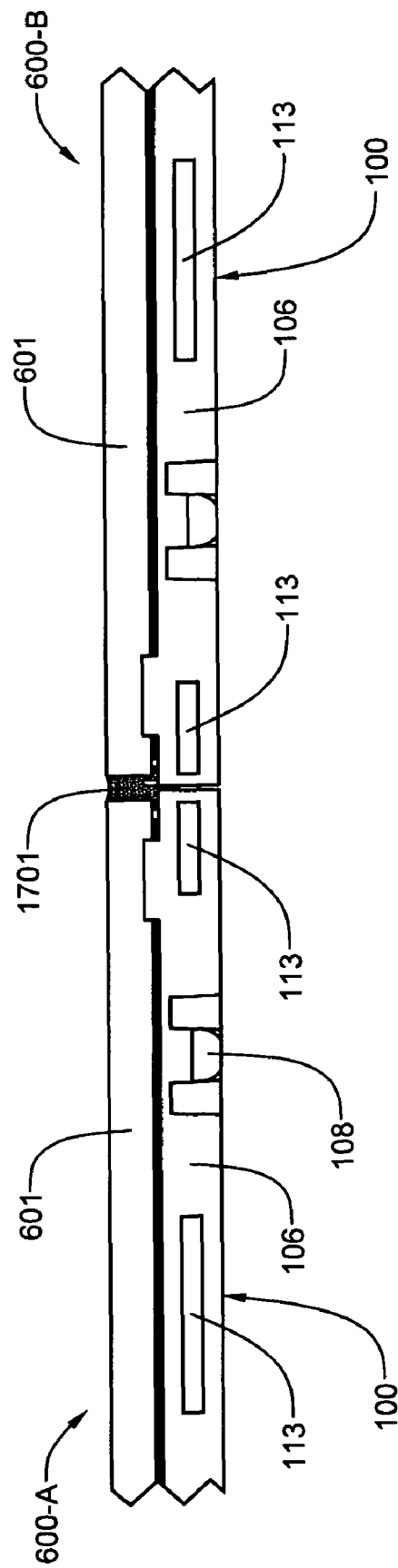
FIG. 17 is a side elevational view of two interlock-coupled subunits, showing flexible, sanded grout installed therebetween.

Referring now to FIG. 17, a pair of square subunits 100-A and 100-B have been interlock coupled together. The seam between the two has been filled with sanded grout 1701. For consumer-install applications, a water-based, acrylic, sanded grout has been formulated that is semi-flexible and is able to withstand a certain amount of flexing without cracking or shattering. The acrylic matrix used in the grout is similar, if not identical, to the water-based acrylic sealants that are marketed for use as tub and tile caulk in bathrooms and kitchens. Although the acrylic sealant may include silicon compounds, it is not RTV-type silicone rubber caulk. For commercial-install applications, the sanded grout may be formulated using a water-insoluble matrix, such as RTV silicone rubber or polyurethane. Although the RTV silicone rubber-based and polyurethane-based sanded grouts formulated for this application may be more durable than the water-based acrylic sanded grouts, they require much more care and expertise during application, as clean-up with water is not possible.

Although only several embodiments of the invention have been disclosed herein, it will be obvious to those having ordinary skill in the art that changes and modifications may be made thereto without departing from the spirit and scope of the invention as hereinafter claimed.

What is claimed is:

1. A floating floor comprising:
   a plurality of interconnected subunits, each subunit including:
      an injection-molded substrate having
         a support grid formed by three intersecting sets of equidistantly-spaced, parallel walls, which form an array of interstitial openings;
         a perimetric wall which surrounds the support grid and forms the sides and outer perimeter of the substrate;
         a laminar sheet unitary and coextensive with the support grid and perimetric wall, which covers an upper end of each interstitial opening;
         an interlock structure, including both female and male components which extend, at least partially, beyond the outer perimeter of the substrate, said interlock structure enabling reversible attachment with other substrates of similar design having the same interlock structure;
         a vertical stabilization system, including a system of interlocking tabs and slots discontinuously positioned about said outer perimeter, said vertical stabilization system restraining vertical movement between adjacent interlock coupled substrates; wherein said tabs and slots being located substantially completely between said male and female components;
      a tile selected from the group consisting of stone, ceramic and porcelain bonded to an upper surface of the laminar sheet;
   means for ensuring that the tile is uniformly spaced from the outer edges of the substrate; and
   grout installed between outer edges of adjacent tiles, said grout having sand embedded within a flexible matrix.

2. The floating floor of claim 1, wherein said means for ensuring comprises at least two locator tabs which project upwardly from each of a pair of adjacent sides of the substrate, said locator tabs being positioned immediately adjacent outer edges of said substrate.

3. The floating floor of claim 1, wherein said substrate is injection molded from a thermoplastic material selected from the group consisting of low-density polyethylene, linear low-density polyethylene, cross-linked high-density polyethylene, ultra-high-molecular-weight polyethylene, and polypropylene copolymer.

4. The floating floor of claim 1, wherein said tile is bonded to said upper surface with epoxy adhesive.

5. The floating floor of claim 4, wherein said means for ensuring comprises at least two dabs of hot melt glue, which immovably secure said tile to said upper surface after said tile has been accurately positioned thereon by pick and place equipment while the epoxy adhesive is curing.

6. The floating floor of claim 1, wherein said interlock structure comprises both female and male components in equal numbers, said components being equally spaced about a perimeter of said substrate.

7. The floating floor of claim 1, wherein each female component comprises a U-shaped member and a bridging section of the perimetric wall, said bridging section spanning a gap formed by said U-shaped member, and each male component comprises an arcuate member and an associated locking tab, each arcuate member and its associated locking tab being insertable within the U-shaped member of a receiving female component, said associated locking tab clipping over the bridging section of the receiving female component.

8. The floating floor of claim 1, wherein said vertical stabilization system comprises:
 a plurality of horizontally disposed tabs which project from the perimetric wall of each substrate; and
 a plurality of slots in the perimetric wall of each substrate which engage the horizontally disposed tabs to restrict vertical movement of adjacent coupled tiles.

9. The floating floor of claim 3, wherein the upper surface of said substrate is subjected to a surface treatment in order to transform it from a low-energy state to a higher-energy state so that epoxy adhesive can be employed to bond the tile to the substrate.

10. A floating floor comprising:
 a plurality of interconnected subunits, each subunit including:
  an injection-molded substrate having
  a support grid formed by at least two intersecting sets of equidistantly-spaced, parallel walls, which form an array of interstitial openings;
  a laminar sheet unitary and coextensive with the support grid, which covers an upper end of each interstitial opening;
  an interlock structure, including both female and male components which extend, at least partially, beyond the outer perimeter of the substrate, said interlock structure enabling reversible attachment with other substrates of similar design having the same interlock structure;
  a vertical stabilization system, including a system of interlocking tabs and slots discontinuously positioned about said outer perimeter, said vertical stabilization system restraining vertical movement between adjacent interlock-coupled substrates; wherein said tabs and slots being located substantially completely between said male and female components;
  a tile bonded to an upper surface of the laminar sheet;
  means for ensuring that the tile is uniformly spaced from the outer edges of the substrate; and
  grout installed between outer edges of adjacent tiles, said grout having sand embedded within a flexible matrix.

11. The floating floor of claim 10, wherein said tile is selected from the group consisting of stone, ceramic and porcelain.

12. The floating floor of claim 10, which further comprises a perimetric wall integral with said laminar sheet, which surrounds the support grid and forms the sides and outer perimeter of the substrate.

13. The floating floor of claim 10, wherein said means for ensuring comprises at least two locator tabs which project upwardly from each of a pair of adjacent sides of the substrate, said locator tabs being positioned immediately adjacent outer edges of said substrate.

14. The floating floor of claim 10, wherein said tile is bonded to said upper surface with epoxy adhesive.

15. The floating floor of claim 14, wherein said means for ensuring comprises at least two dabs of hot melt glue, which immovably secure said tile to said upper surface after said tile has been accurately positioned thereon by pick and place equipment while the epoxy adhesive is curing.

16. The floating floor of claim 12, wherein said interlock structure comprises both female and male components in equal numbers, said components being equally spaced about a perimeter of said substrate, each female component comprising a U-shaped member and a bridging section of the perimetric wall, said bridging section spanning a gap formed by said U-shaped member, and each male component comprises an arcuate member and an associated locking tab, each arcuate member and its associated locking tab being insertable within the U-shaped member of a receiving female component, said associated locking tab clipping over the bridging section of the receiving female component.

17. The floating floor of claim 10, wherein said vertical stabilization system comprises:
 a plurality of horizontally disposed tabs which project from the perimetric wall of each substrate; and
 a plurality of slots in the perimetric wall of each substrate which engage the horizontally disposed tabs to restrict vertical movement of adjacent coupled tiles.

18. The floating floor of claim 3, wherein the upper surface of said substrate is subjected to a surface treatment in order to transform it from a low-energy state to a higher-energy state so that epoxy adhesive can be employed to bond the tile to the substrate.

19. The floating floor of claim 1, wherein said matrix is selected from the group consisting of water-based acrylic sealants and water-insoluble RTV silicon rubber and polyurethane sealants.

20. The floating floor of claim 10, wherein said matrix is selected from the group consisting of water-based acrylic sealants and water-insoluble RTV silicon rubber and polyurethane sealants.

* * * * *